US012224497B2

United States Patent
Bahceci et al.

(10) Patent No.: US 12,224,497 B2
(45) Date of Patent: Feb. 11, 2025

(54) RECONFIGURABLE MASSIVE MIMO ARRAY SYSTEM FOR ENERGY EFFICIENT COMMUNICATIONS

(71) Applicant: Telefonaktiebolaget LM Ericsson (publ), Stockholm (SE)

(72) Inventors: Israfil Bahceci, Kanata (CA); Shady Elkamhawy, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/710,768

(22) PCT Filed: Dec. 17, 2021

(86) PCT No.: PCT/IB2021/061942
§ 371 (c)(1),
(2) Date: May 16, 2024

(87) PCT Pub. No.: WO2023/111657
PCT Pub. Date: Jun. 22, 2023

(65) Prior Publication Data
US 2024/0332793 A1    Oct. 3, 2024

(51) Int. Cl.
*H01Q 3/24*   (2006.01)
(52) U.S. Cl.
CPC ..................... *H01Q 3/24* (2013.01)
(58) Field of Classification Search
CPC ....................................................... H01Q 3/24
(Continued)

(56) References Cited

U.S. PATENT DOCUMENTS 10,608,678 B1 *  3/2020 Hormis ............... H04B 1/0458
2009/0146894 A1    6/2009 Drexier et al.
(Continued)

FOREIGN PATENT DOCUMENTS

CN          113315552 A  *  8/2021  ............. G06F 30/20
WO    WO-2022261505 A1 * 12/2022  ........... H01Q 1/1257

OTHER PUBLICATIONS

International Search Report and Written Opinion dated Aug. 1, 2022 issued in PCT Application No. PCT/IB2021/061942, consisting of 12 pages.
(Continued)

*Primary Examiner* — Harry K Liu
(74) *Attorney, Agent, or Firm* — Weisberg I.P. Law, P.A.

(57) ABSTRACT

A method and radio interface having a reconfigurable massive multiple input-multiple output (MIMO) array system for energy efficient communications are provided. According to one aspect, a method includes, for a beam direction, one of activating and deactivating each of a plurality of radio frequency (RF), branches based at least in part on the beam direction and at least one power constraint, each RF branch being in electrical communication with at least one antenna of an antenna array of the radio interface. The method also includes, for the beam direction, configuring at least one switch of a plurality of switches positioned between antenna elements to selectively affect a mutual coupling between at least two antenna elements of the antenna array that are in electrical communication with deactivated RF branches, the configuring being based at least in part on the beam direction.

18 Claims, 6 Drawing Sheets

(58) Field of Classification Search
USPC .......................................................... 342/374
See application file for complete search history.

(56) References Cited

U.S. PATENT DOCUMENTS

| | | | |
|---|---|---|---|
| 2014/0161059 A1* | 6/2014 | Lee .................... | H01Q 3/2611 |
| | | | 370/329 |
| 2021/0194124 A1 | 6/2021 | Kim et al. | |
| 2022/0272694 A1* | 8/2022 | Pezeshki ................ | H04B 7/088 |

OTHER PUBLICATIONS

Lu et al., An Overview of Massive MIMO: Benefits and Challenges; IEEE Journal of Selected Topics in Signal Processing, vol. 8, No. 5; Oct. 2014, consisting of 17 pages.

Andreas F. Molisch et al., MIMO Systems With Antenna Selection; IEEE Microwave Magazine; Mar. 2004, consisting of 11 pages.

Hardy Halbauer et al., Energy Efficient Massive MIMO Array Configurations; 2018 IEEE Globecom Workshops (GC Wkshps), consisting of 6 pages.

Christos Christodoulou et al., Reconfigurable Antennas for Wireless and Space Applications; Proceedings of the IEEE, vol. 100, No. 7, Jul. 2012, consisting of 12 pages.

* cited by examiner

RECONFIGURABLE MASSIVE MIMO ARRAY SYSTEM FOR ENERGY EFFICIENT COMMUNICATIONS

CROSS-REFERENCE TO RELATED APPLICATIONS

This application is a Submission Under 35 U.S.C. § 371 for U.S. National Stage Patent Application of International Application Number: PCT/IB2021/061942, filed Dec. 17, 2021 entitled "RECONFIGURABLE MASSIVE MIMO ARRAY SYSTEM FOR ENERGY EFFICIENT COMMUNICATIONS," the entirety of which is incorporated herein by reference.

TECHNICAL FIELD

The present disclosure relates to wireless communication and in particular, to reconfigurable massive multiple input-multiple output (MIMO) array systems for energy efficient communications.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Massive MIMO systems provide significant capacity and coverage enhancements for wireless communication systems as compared with prior arrangements. Multi-antenna systems utilize space diversity by modulating signals at different spatial locations with a proper complex beamforming weight to either perform a directional transmission or a spatially diverse transmission to make use of multi-path propagation. Larger array sizes amount to larger radio frequency (RF) chains resulting in power hungry wireless communication devices. While massive MIMO systems increase the capacity significantly, depending on the number of users and traffic load, not all branches in the radio/antenna system have to be used. To save power, the system can shut down a selected number of antennas and RF branches to attain some desired power saving level while satisfying the capacity and coverage requirements for the underlying traffic load.

Another avenue for antenna and antenna array design includes reconfigurable antenna systems where driven and/or parasitic antenna elements can be interconnected via switches that can be switched on and off. Such antennas can change their driven or parasitic layer shapes to support different bandwidths or directional capabilities. Such antennas have significant use for 5G and beyond technologies.

While massive MIMO systems claim significant capacity and coverage performance improvements over non-massive MIMO systems, a drawback is that each RF chain consumes significant energy in both the analog and digital front ends. Analog front ends (AFE) employ power amplifiers (PAS) that consume large amounts of energy. Digital front end (DFE) modules must perform multiple functionalities to combat non-linearities in the RF chain. To save power, a number of RF branches can be shut down. However, this reduces capacity and coverage area. While load-aware muting is possible, with traditional active antenna array systems, the muted branches cannot provide signal improvement to reclaim the beamforming and power loss. This may result in significant coverage and capacity loss. Also for high traffic load levels, the saving is either rendered insignificant or very limited.

Reconfigurability of a reconfigurable array at the driven layer creates significant challenges due to the high-currents through the switches that select the RF branches. Therefore, a reconfigurable array at the driven layer is problematic for massive MIMO systems when they are switched on.

SUMMARY

Some embodiments advantageously provide a method and system for reconfigurable massive multiple input-multiple output (MIMO) array system for energy efficient communications.

In some embodiments, when the reconfiguration switches at the driven antenna layer are turned off, the impact of branch switching is not as great as when the switches are turned off. Accordingly, some embodiments may be implemented for sleep mode operation of massive MIMO systems.

In some embodiments, an intelligent active antenna array suitable for sleep-mode operation where some of the RF branches can be shut down is configured so that those antenna elements that are connected to the switched-off RF branches can still be utilized for enhancing the activated part of the array via mutual coupling interactions.

The reconfigurable active array system (RAAS) described herein may use conventional reconfigurable array technologies where driven elements are interconnected via switch circuitries. The switches can have two-states (ON-OFF) or multiple states (e.g., varactor diodes). A multi-state switch option provides more degrees of freedom to achieve desired directional resolution and beam-forming gain. The RAAS may contain two computing modules to control (i) active branch selection and (ii) switch states. The two modules cooperate to determine the best activated array dimension and its relative position within the array to optimize the beamforming gain and the parasitic interaction among the active and muted antenna elements. Thus, some embodiments provide:

Reconfigurable AAS architecture suitable for energy efficient (MIMO sleep-mode) operation;
MIMO sleep-mode array dimension and orientation selection suitable for the RAAS architecture; and
Greater power saving with much lower impact on capacity/coverage According to one aspect, a radio interface in a wireless communication device, is provided. The radio interface is configured to include a plurality of radio frequency, RF, branches and an antenna array having a plurality of antenna elements, each antenna element of the antenna array being in electrical communication with an RF branch. The radio interface also includes a plurality of switches, each switch configured to selectively affect a mutual coupling between at least two antenna elements of the antenna array. Processing circuitry of the radio interface is in communication with the switches and is configured to, for a beam direction: one of activate and deactivate each RF branch based at least in part on the beam direction and at least one power constraint; and configure at least one switch of the plurality of switches to selectively affect a mutual coupling between at least two antenna elements of the antenna array that are in electrical communication with deactivated RF branches, the configuring being based at least in part on the beam direction.

According to this aspect, in some embodiments, the at least one switch is configured to maximize a performance parameter for the beam direction. In some embodiments, the performance parameter is one of gain, signal to noise ratio, SNR, and directivity. In some embodiments, configuring the at least one switch includes applying a machine learning algorithm to learn a configuration of the at least one switch that achieves a performance objective. In some embodiments, configuring the at least one switch includes performing a numerical electromagnetic analysis of a model of the antenna array. In some embodiments, the numerical electromagnetic analysis is performed to determine a direction of surface waves on the antenna array. In some embodiments, configuring the at least one switch is based at least in part on a distance between an antenna element in electrical communication with a deactivated RF branch and an antenna element in electrical communication with an activated RF branch. In some embodiments, configuring the at least one switch is based at least in part on a direction from an antenna element in electrical communication with a deactivated RF branch to an antenna element in electrical communication with an activated RF branch. In some embodiments, one of activating and deactivating each RF branch includes deactivating at least one RF branch having antenna elements that are adjacent to antenna elements of at least one activated RF branch. In some embodiments, one of activating and deactivating each RF branch includes activating a broadside array of the antenna array and deactivating at least one RF branch adjacent to the broadside array, and configuring at the least one switch includes selectively affecting the mutual coupling between at least two antenna elements of the at least one deactivated adjacent RF branch to select one of an azimuth direction and an elevation direction of a beam of the activated broadside array.

According to another aspect, a method in radio interface of a wireless communication device includes: for a beam direction, one of activating and deactivating each of a plurality of radio frequency, RF, branches based at least in part on the beam direction and at least one power constraint, each RF branch being in electrical communication with at least one antenna of an antenna array of the radio interface. The method also includes for the beam direction, configuring at least one switch of a plurality of switches positioned between antenna elements to selectively affect a mutual coupling between at least two antenna elements of the antenna array that are in electrical communication with deactivated RF branches, the configuring being based at least in part on the beam direction.

According to this aspect, in some embodiments, the at least one switch is configured to maximize a performance parameter for the beam direction. In some embodiments, the performance parameter is one of gain, signal to noise ratio, SNR, and directivity. In some embodiments, configuring the at least one switch includes applying a machine learning algorithm to learn a configuration of the at least one switch that achieves a performance objective. In some embodiments, configuring the at least one switch includes performing a numerical electromagnetic analysis of a model of the antenna array. In some embodiments, the numerical electromagnetic analysis is performed to determine a direction of surface waves on the antenna array. In some embodiments, configuring the at least one switch is based at least in part on a distance between an antenna element in electrical communication with a deactivated RF branch and an antenna element in electrical communication with an activated RF branch. In some embodiments, configuring the at least one switch is based at least in part on a direction from an antenna element in electrical communication with a deactivated RF branch to an antenna element in electrical communication with an activated RF branch. In some embodiments, one of activating and deactivating each RF branch includes deactivating at least one RF branch having antenna elements that are adjacent to antenna elements of at least one activated RF branch. In some embodiments, one of activating and deactivating each RF branch includes activating a broadside array of the antenna array and deactivating at least one RF branch adjacent to the broadside array; and configuring at the least one switch includes selectively affecting the mutual coupling between at least two antenna elements of the at least one deactivated adjacent RF branch to select one of an azimuth direction and an elevation direction of a beam of the activated broadside array.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail example embodiments, it is noted that the embodiments reside primarily in combinations of apparatus components and processing steps related to reconfigurable massive multiple input-multiple output (MIMO) array system for energy efficient communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, a reconfigurable AAS architecture is provided that may include at least one of the following features:
- antenna elements connected to the muted RF branches can continue their roles as passive antenna elements providing parasitic gains even after bring muted;
- the RF branch selection and switch state selection modules can optimize active/muted array pattern to maximize and/or maintain their passive contribution to the overall system;
- the utilization of muted antenna elements reduces the performance cost of muting a branch and thus allow for more branches to be muted as needed from energy-performance optimizer block;
- the switch technology (e.g., PIN, Varactor diode) allows for on-off switching on the order of micro seconds or even lower switch on-off times. This allows for parasitic-based transmission direction control during the sleep mode operation. Thus, despite reducing the active array size, there still exist additional degrees of freedom to perform higher resolution beamforming; and/or
- the switch circuitries may operate at small power levels but provide significant beamforming gain enhancement.

The following description focuses on PIN and Varactor diode-based technologies; however, other switching technology suitable for the underlying antenna element/array design and required switch time capabilities may be employed.

Figure 1:
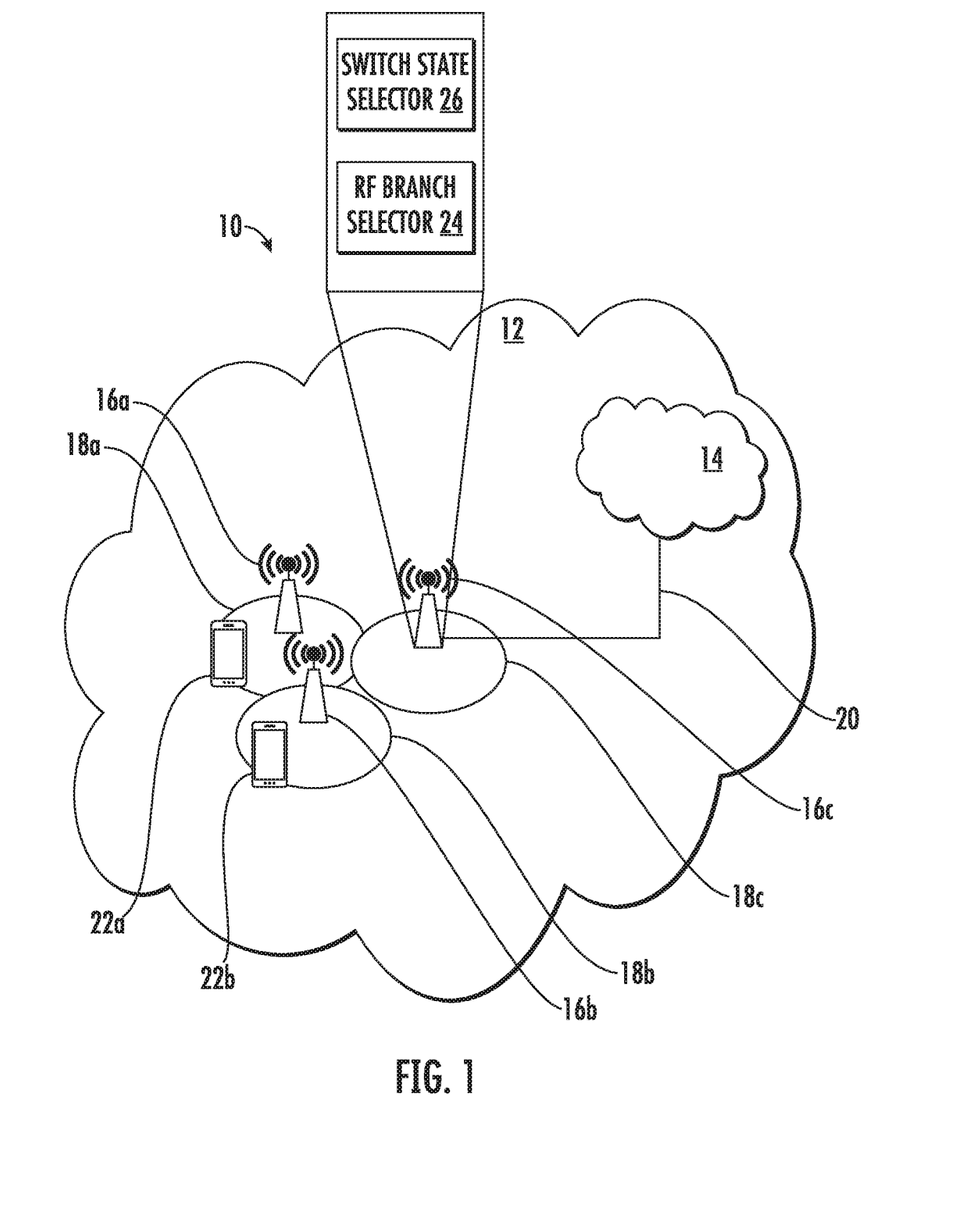
FIG. 1 is a schematic diagram of an example network architecture illustrating a communication system according to principles disclosed herein.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include an RF branch selector 24 which is configured to for a beam direction, one of activating and deactivating each of a plurality of radio frequency, RF, branches based at least in part on the beam direction and at least one power constraint, each RF branch being in electrical communication with at least one antenna of an antenna array of the radio interface. The network node 16 is also configured to include a switch state selector 26 which is configured to for the beam direction, configuring at least one switch of a plurality of switches positioned between antenna elements to selectively affect a mutual coupling between at least two antenna elements of the antenna array that are in electrical communication with deactivated RF branches, the configuring being based at least in part on the beam direction.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 is shown in the radio interface 30, but could be implemented outside the radio interface 30 but within the network node 16. The processing circuitry 36 may include a processor 38 and a memory 40. The memory 40 may be configured to store one or more lookup tables 41 which may be configured to store sets of switch states for achieving desired beams. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include an RF branch selector 24 which is configured to for a beam direction, one of activating and deactivating each of a plurality of radio frequency, RF, branches based at least in part on the beam direction and at least one power constraint, each RF branch being in electrical communication with at least one antenna of an antenna array of the radio interface. The processing circuitry 36 of the network node 16 is also configured to include a switch state selector 26 which is configured to for the beam direction, configuring at least one switch of a plurality of switches positioned between antenna elements to selectively affect a mutual coupling between at least two antenna elements of the antenna array that are in electrical communication with deactivated RF branches, the configuring being based at least in part on the beam direction.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

In some embodiments, the network node 16 may be configured to include the aforementioned antenna array 34 having antenna elements 35. The antenna elements 35 may be configured to be grouped in RF branches 60, and may be actively or passively connected by switches 62. The RF branches 60 are selected by the RF branch selector 24 and the switches 62 are configured by the switch state selector 26. The beamformer 64 forms a beam to point in one or more directions.

Figure 2:
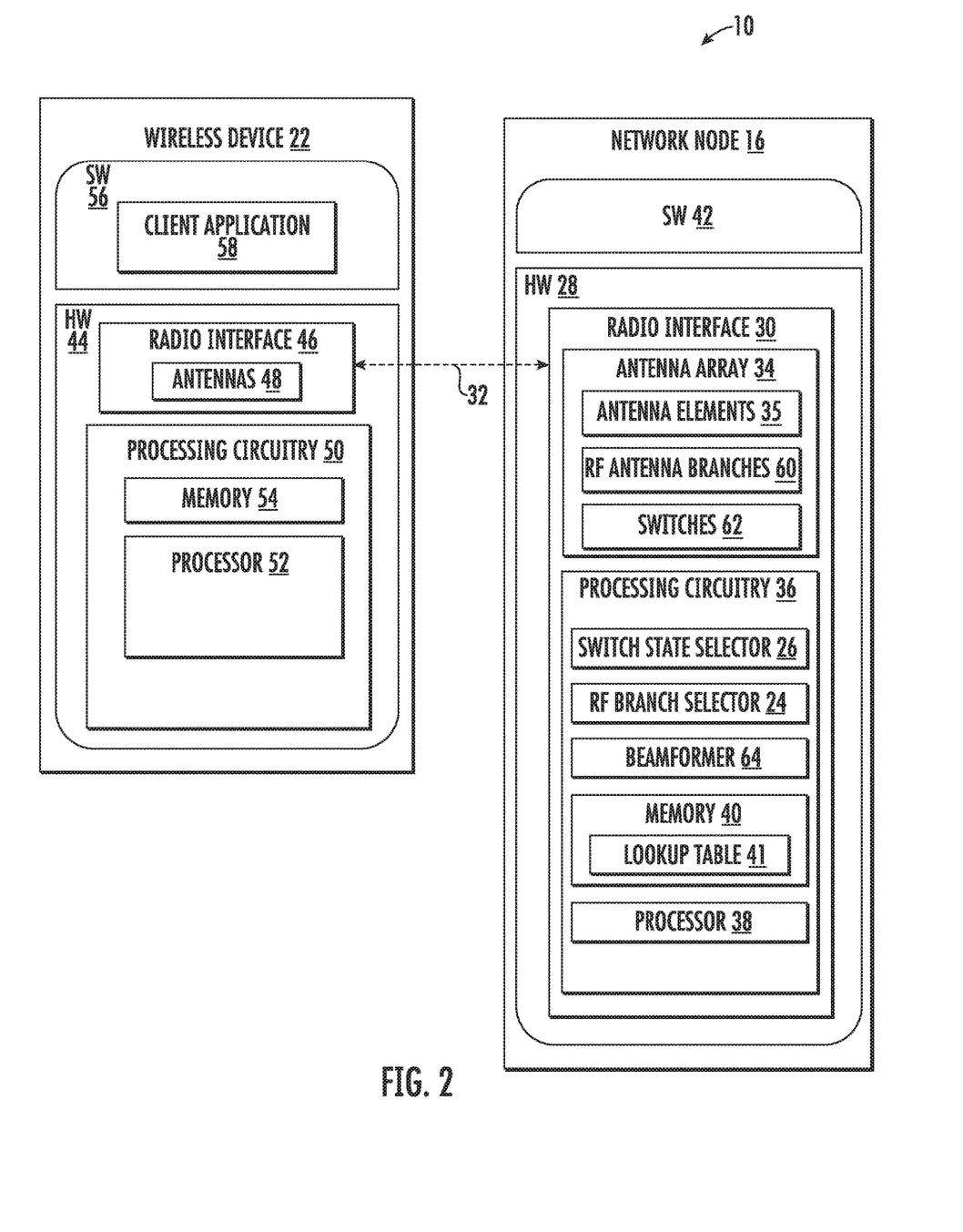
FIG. 2 is a block diagram of a network node in communication with a wireless device over a wireless connection according to some embodiments of the present disclosure.

In some embodiments, the inner workings of the network node 16 and WD 22 may be as shown in FIG. 2 and independently, the surrounding network topology may be that of FIG. 1.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as the RF branch selector 24 and the switch state selector 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
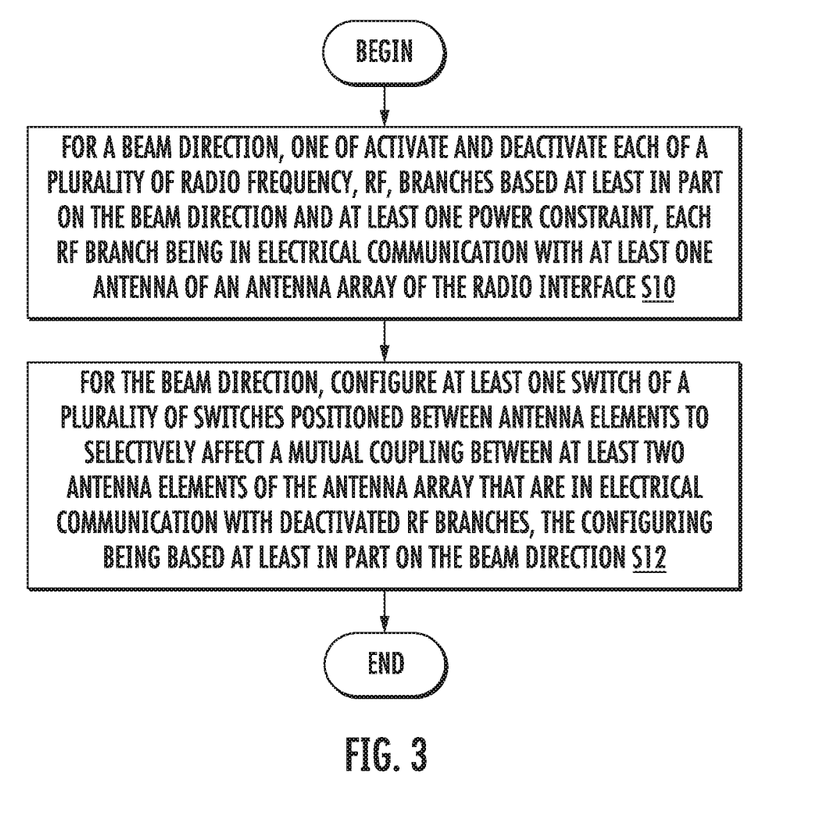
FIG. 3 is a flowchart of an example process in a radio interface for reconfiguring an antenna array according to some embodiments of the present disclosure.

FIG. 3 is a flowchart of an example process in a radio interface 30 of a network node 16 configured to reconfigure an antenna array 34. One or more blocks described herein may be performed by one or more elements of network node 16 such as by one or more of processing circuitry 36 (including the RF branch selector 24 and the switch state selector 26), processor 38, and/or radio interface 30. Network node 16 such as via processing circuitry 36 and/or processor 38 and/or radio interface 30 is configured to: for a beam direction, one of activate and deactivate each of a plurality of radio frequency, RF, branches based at least in part on the beam direction and at least one power constraint, each RF branch 60 being in electrical communication with at least one antenna of an antenna array of the radio interface (Block S10). The method also includes for the beam direction, configuring at least one switch of a plurality of switches positioned between antenna elements to selectively affect a mutual coupling between at least two antenna elements of the antenna array that are in electrical communication with deactivated RF branches 60, the configuring being based at least in part on the beam direction (Block S12).

According to this aspect, in some embodiments, the at least one switch 62 is configured to maximize a performance parameter for the beam direction. In some embodiments, the performance parameter is one of gain, signal to noise ratio, SNR, and directivity. In some embodiments, configuring the at least one switch 62 includes applying a machine learning algorithm to learn a configuration of the at least one switch 62 that achieves a performance objective. In some embodiments, configuring the at least one switch 62 includes performing a numerical electromagnetic analysis of a model of the antenna array 34. In some embodiments, the numerical electromagnetic analysis is performed to determine a direction of surface waves on the antenna array 34. In some embodiments, configuring the at least one switch 62 is based at least in part on a distance between an antenna element 35 in electrical communication with a deactivated RF branch 60 and an antenna element 35 in electrical communication with an activated RF branch 60. In some embodiments, configuring the at least one switch 62 is based at least in part on a direction from an antenna element 35 in electrical communication with a deactivated RF branch 60 to an antenna element 35 in electrical communication with an activated RF branch 60. In some embodiments, one of activating and deactivating each RF branch 60 includes deactivating at least one RF branch 60 having antenna elements 35 that are adjacent to antenna elements 35 of at least one activated RF branch 60. In some embodiments, one of activating and deactivating each RF branch 60 includes activating a broadside array of the antenna array 34 and deactivating at least one RF branch 60 adjacent to the broadside array; and configuring at the least one switch 62 includes selectively affecting the mutual coupling between at least two antenna elements 35 of the at least one deactivated adjacent RF branch 60 to select one of an azimuth direction and an elevation direction of a beam of the activated broadside array.

Having described the general process flow of arrangements of the disclosure and having provided examples of hardware and software arrangements for implementing the processes and functions of the disclosure, the sections below provide details and examples of arrangements for reconfigurable massive multiple input-multiple output (MIMO) array system for energy efficient communications.

Figure 4:
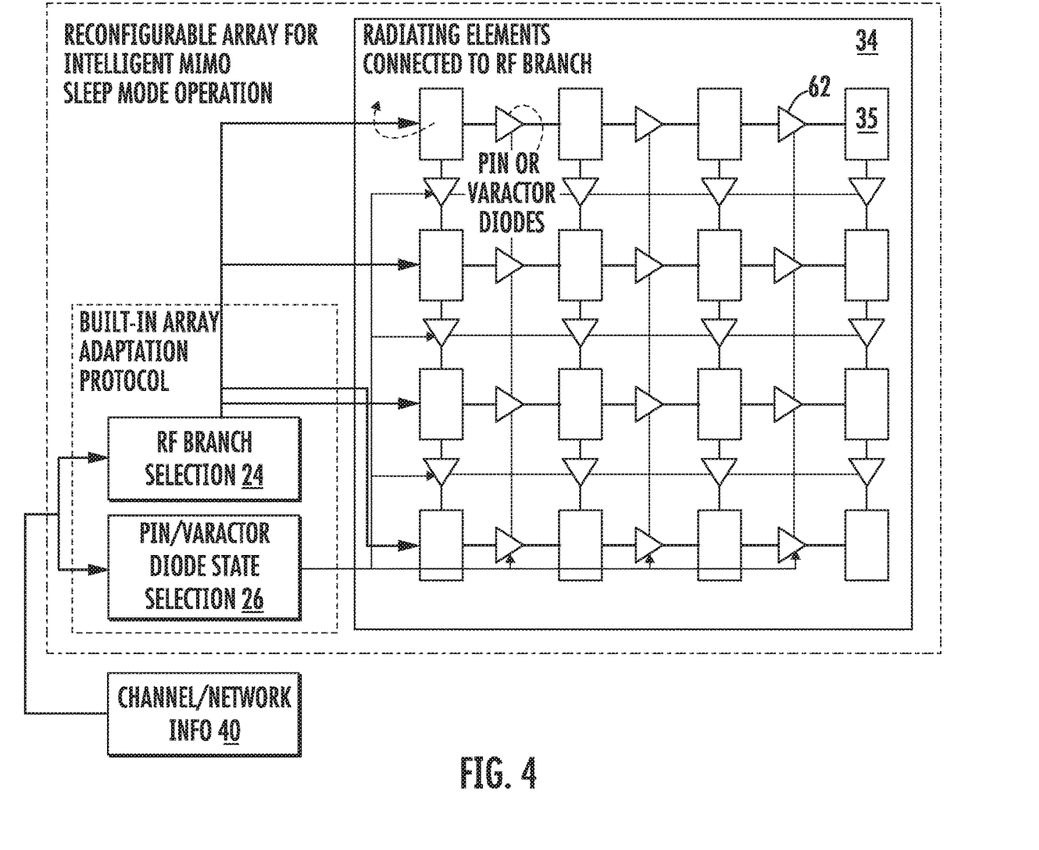
FIG. 4 is a diagram of a 4×4 antenna array with all antenna elements turned activated by switches.

A block diagram of an example of an intelligent reconfigurable antenna array system is depicted in FIG. 4. The built-in array adaptation protocol is performed via two modules: (i) an RF branch selector 24 and (ii) a switch state selector 26. The RF branch selector 24 is configured to choose the number and orientation of antenna elements 35 of the antenna array 34 on which the RF power will be conducted. The switch state selector 26 controls the state of the switches to enhance the radiation gain in the desired direction(s) along with the driven elements 35. In comparison to some conventional reconfigurable array implementations, some embodiments disclosed herein, use the antenna element 35 whose RF branches 60 have been turned off to shape a beam of the antenna array 34. Thus, an antenna array 34 whose antenna elements 35 can be set to behave either as a driven element or as a parasitic element is disclosed. This enables an improvement in gain over known solutions, which further increases power conservation.

In some embodiments, the RF branch selector 24 may perform the following tasks:
Receive the direction information and power budget (either in the form of allowed number of branches or total power level) from memory 40;
Based on the direction information and the power saving requirement, a suitable subarray dimension is determined. Direction information can originate from filtered a precoder matrix indicator (PMI) from Type-1 channel state information reference signal (CSI-RS) feedback or sounding reference signal (SRS) measurements. In either case, the azimuth and elevation beamforming capabilities may be assessed for the cell for the ongoing traffic load. An $N_{row,sel} \times N_{col,sel}$ subarray is selected from the $N_{row} \times N_{col}$ full array 34 in case of Type-1 feedback information, or $N_{row,sel} N_{col,sel}$ antennas are selected to maximize SRS-based MIMO signal to noise ratio (SNR) in case of SRS-assisted MIMO precoding:
For elevation beamforming: $N_{row,sel} > 1$ are selected;
For azimuth beamforming: $N_{col,sel} > 1$ are selected;
Branch selection takes into account the potential impact on beamforming gain from muted antenna elements 35, taking into account mutual coupling between muted and unmuted antenna elements 35:
The impact from muted antenna elements 35 is antenna element position and target direction dependent; and/or
The muted antenna elements 35 may be in the region of the array 34 that is away from the target direction so that they are not impacted by the surface waves created by directional transmissions from the unmuted part and in addition, the muted antenna elements 35 can enhance the gain in the target direction via mutual-coupling (parasitic);
Selected branch information is sent to the switch state selector 26. The switch state selector 26 may perform the following tasks:
For the given branch selection, the switch state selector 26 switches off the branches that are neighbor to the antenna elements 35 connected to the RF branches 60 selected by the RF branch selector 24;
Depending on the direction information and the beamformer used for the active part of the antenna array 34, the switch state selector 26 may determine the switch states for the remaining switches:
The switch states for the remaining switches 62 may depend on whether the main directional transmission is broad-side or off-broadside; and/or
The switch state selector 26 may determine switch states off-line by full-wave analysis tools for a given set of activated antenna elements 35. A look-up table 41 can be used by the processing circuitry 36 in conjunction with the underlying precoder to look up the states of the remaining switches 62. Type-1 CSI-RS feedback PMI indices may be used to determine the target direction and decide on the switch states of the remaining switches 62:
This look-up table 41 can also be determined off-line according to precoder column-space or another algorithm;
Alternatively, the switch state selector 26 may apply adaptive algorithms or machine learning algorithms to determine the switch states connecting muted antenna elements 35 such that active beamforming due to driven array 34 is enhanced.

Figure 5:
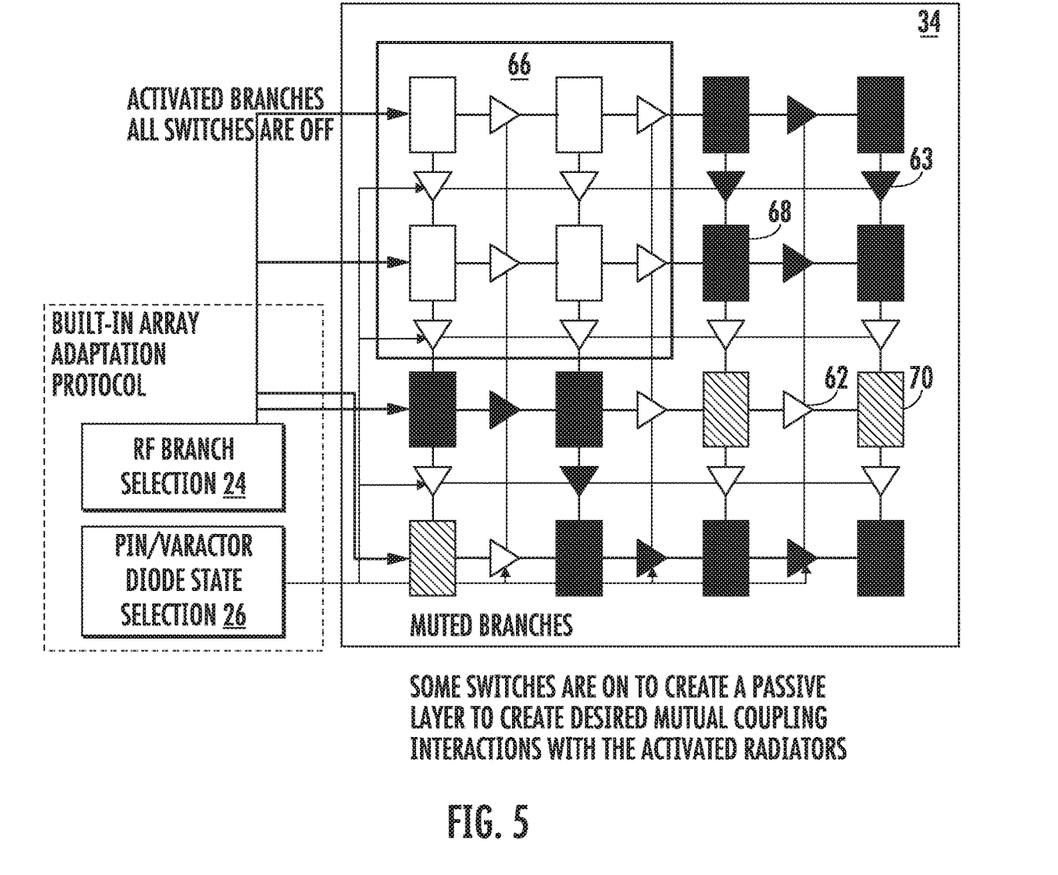
FIG. 5 is a diagram of a 4×4 antenna array with active antenna elements in a quadrant of a 4×4 antenna array and with passive antenna elements selected to achieve a gain of the antenna array.
Figure 6:
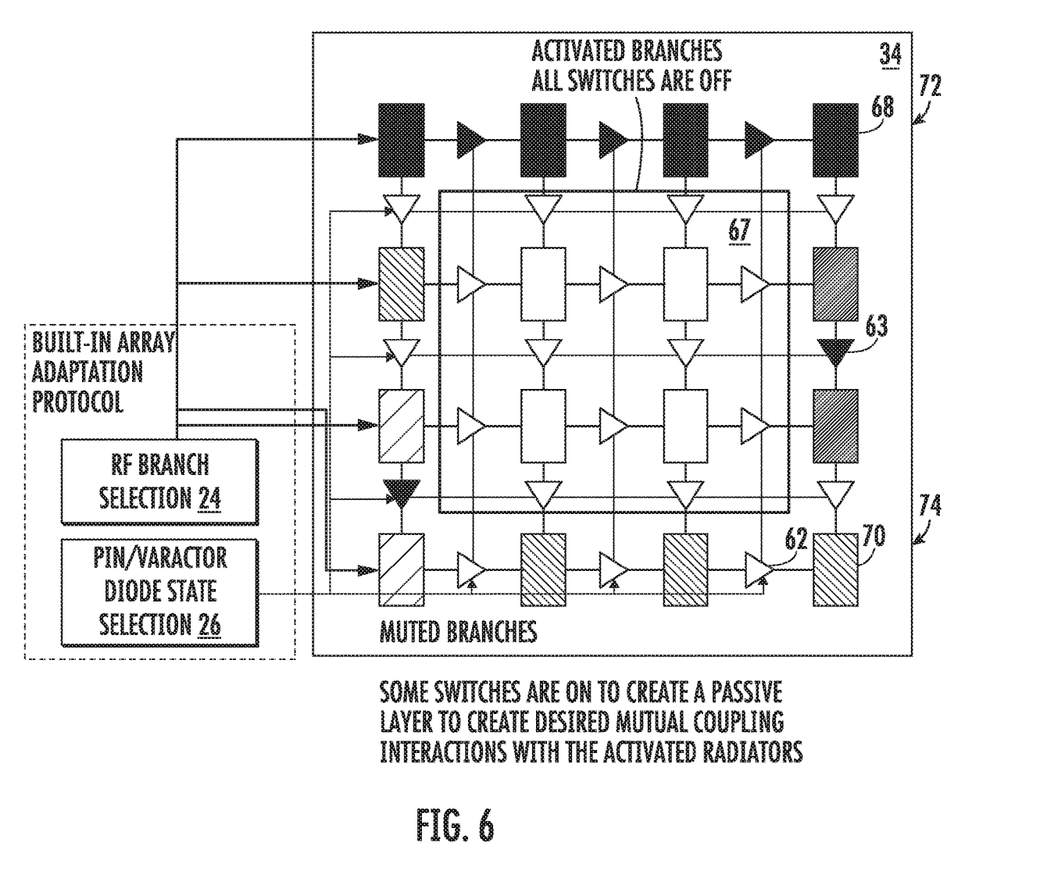
FIG. 6 is a diagram of a 4×4 antenna array with active antenna elements in a center of the antenna array and with passive antenna elements selected to achieve an elevation tilt.

FIGS. 5 and 6 illustrate two examples of MIMO sleep mode operation for a 4×4 antenna array 34 (an antenna array 34 having 4 columns and 4 rows). For this configuration, four RF branches 60 may be activated or deactivated to achieve a desired transmit power level or beamforming gain. Depending on the direction of traffic load, the network node 16, via the radio interface 30, can boost the directional transmissions via the muted radiators (antenna elements 35) of the antenna array 34. In FIG. 5, a 2×2 subarray 66 on the left upper part of the full 4×4 antenna array 34 is active, i.e., the antenna elements 35 of the 2×2 subarray are connected to the beamformer 64. The antenna elements 35 are connected via the switch states of the switches 62 and 63 to provide sufficient mutual coupling interaction to affect the beam from the 2×2 active array. In particular, in FIG. 5, some switches 62 are turned off, while some switches 63 are turned on. When a switch 63 is turned on adjacent antenna elements 68 are disconnected from the antenna array 34. Note that antenna elements 68 and 70 are also referred to as antenna elements 35. Reference numeral 68 denotes antenna elements 35 that are deactivated and not passively connected. Reference numeral 70 denotes antenna elements 35 that are not activated but are passively connected.

Similarly, a broadside traffic beam may result in the central 2×2 subarray 67 of the antenna array 34 such that peripheral antenna elements 35 can be properly connected to provide the desired beam tilting from parasitic interaction. FIG. 6 is an example of a configuration determined by the RF branch selector 24 and the switch state selector 26 for transmitting a broadside traffic beam. In sleep mode operation, the 2×2 activated subarray 67 of a 4×4 antenna array 34 directs a beam that is broadside in azimuth but tilted downward in elevation. In FIG. 6, the upper row 72 of antenna elements 68 are passively connected and the lower row 74 of antenna elements 35 are disconnected. This configuration tilts the beam below the horizon. Passively connecting or disconnecting elements in the columns to the left and right of the activated subarray 66, may be employed to increase a gain of the antenna array 34.

FIGS. 5 and 6 are just two non-limiting examples to indicate the capabilities of the RAAS architecture for MIMO sleep mode operation according to method disclosed herein. Different combinations of elements for any sized antenna array 34 can be activated, passively connected, or disconnected to achieve different beams. By passively connecting some antenna elements 35, parasitic effects can be employed to advantageously to enhance the gain of the antenna array 34, while conserving power.

Given the branches to be activated as determined by the RF branch selector 24, the switch state selector 26 may select and implement the state of each switch 62, 63 so as to achieve a configuration that enhance gain of the beam generated by the antenna array 34.

In some embodiments, the following steps may be performed:

1. Obtain direction of arrival information (which may be in different forms such as Global Positioning System (GPS) information, precoder index feedback from the WD, direction of arrival (DoA) based on SRS measurements) for WDs being scheduled. Determine the center of gravity of directional transmissions (mean direction) weighted by the WD and/or traffic priority;
2. Obtain the traffic load information for a desired time frame for the upcoming transmissions and determine the array dimension sufficient for the predicted traffic;
3. Use a look-up table such as look-up table 41 to determine the relative position of the activated subarray determined in Step2. For the look-up table 41, in some embodiments one of the following two options may be implemented:
    a. Pre-generated look-up table: Store switch states for various beam directions that achieve an optimized gain of the antenna using at least some passively connected antenna elements 70. Optimum gains of the antenna array 34 may be determined using a full-wave antenna array analysis or other analysis method for predicting a performance of the antenna array 34 for various activation states of the switches 62, 63. Various full-wave analysis tools or tests can be employed to determine the interaction of muted and unmuted antenna elements 68 and 70. Machine learning methods may also be employed to determine optimum combinations of switch states for various beams; and
    b. On-line method: A learning unit, which may be implemented by the processing circuitry 36 and/or the switch state selector 26, adaptively adjusts the parasitic layer switch states as a function of directional center-of-gravity. The method can quickly learn the state-relations and create a look-up table 41 and starts using the automatically obtained look-up table 41. The procedure can be repeated as needed depending on the network/channel variations.
4. For the scheduled users during power-save mode operation, find the precoder matrix and set the switch states as determined from the look-up table 41; and
5. Monitor the mean direction and array-state (active subarray position and switch states) and learn the preferred array-states for mean directions of the beams generated by the antenna array 34. Create an outer look-up table to be used to skip 3.a and 3.b.

Some of the functionality described herein may be performed in the cloud and/or otherwise remotely. For example, a core network node 14 that is aware of traffic load in the network can adjust the array dimensions and switch states of the antenna system of the network node 16 to provide an optimum extent of power conservation while achieving the desired coverage/capacity performance.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviation used herein may be defined as follows:

| | |
|---|---|
| AAS | Active Antenna System |
| AFE | Analog Front End |
| DFE | Digital Front End |
| MIMO | Multiple Input Multiple Output |
| RAAS | Reconfigurable AAS |
| RF | Radio Frequency |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A radio interface in a wireless communication device, comprising:
    a plurality of radio frequency, RF, branches;
    an antenna array having a plurality of antenna elements, each antenna element of the antenna array being in electrical communication with an RF branch;
    a plurality of switches, each switch configured to selectively affect a mutual coupling between at least two antenna elements of the antenna array; and
    processing circuitry in communication with the plurality of switches, the processing circuitry configured to, for a beam direction:
    one of activate and deactivate each RF branch based at least in part on the beam direction and at least one power constraint, one of activating and deactivating each RF branch including activating a broadside array of the antenna array and deactivating at least one RF branch adjacent to the broadside array; and
    configure at least one switch of the plurality of switches to selectively affect a mutual coupling between at least two antenna elements of the antenna array that are in electrical communication with deactivated RF branches, the configuring being based at least in part on the beam direction, configuring the at least one switch including selectively affecting the mutual coupling between at least two antenna elements of at least one deactivated adjacent RF branch to select one of an azimuth direction and an elevation direction of a beam of the activated broadside array.

2. The radio interface of claim 1, wherein the at least one switch is configured to maximize a performance parameter for the beam direction.

3. The radio interface of claim 2, wherein the performance parameter is one of gain, signal to noise ratio, SNR, and directivity.

4. The radio interface of claim 1, wherein configuring the at least one switch includes applying a machine learning algorithm to learn a configuration of the at least one switch that achieves a performance objective.

5. The radio interface of claim 1, wherein configuring the at least one switch includes performing a numerical electromagnetic analysis of a model of the antenna array.

6. The radio interface of claim 5, wherein the numerical electromagnetic analysis is performed to determine a direction of surface waves on the antenna array.

7. The radio interface of claim 1, wherein configuring the at least one switch is based at least in part on a distance between an antenna element in electrical communication with a deactivated RF branch and an antenna element in electrical communication with an activated RF branch.

8. The radio interface of claim 1, wherein configuring the at least one switch is based at least in part on a direction from an antenna element in electrical communication with a deactivated RF branch to an antenna element in electrical communication with an activated RF branch.

9. The radio interface of claim 1, wherein one of activating and deactivating each RF branch includes deactivating at least one RF branch having antenna elements that are adjacent to antenna elements of at least one activated RF branch.

10. A method in radio interface of a wireless communication device, the method comprising:
    for a beam direction, one of activating and deactivating each of a plurality of radio frequency, RF, branches based at least in part on the beam direction and at least one power constraint, each RF branch being in electrical communication with at least one antenna of an antenna array of the radio interface, one of activating and deactivating each RF branch including activating a broadside array of the antenna array and deactivating at least one RF branch adjacent to the broadside array; and
    for the beam direction, configuring at least one switch of a plurality of switches positioned between antenna elements to selectively affect a mutual coupling between at least two antenna elements of the antenna array that are in electrical communication with deactivated RF branches, the configuring being based at least in part on the beam direction, configuring the at least one switch including selectively affecting the mutual coupling between at least two antenna elements of at least one deactivated adjacent RF branch to select one of an azimuth direction and an elevation direction of a beam of the activated broadside array.

11. The method of claim 10, wherein the at least one switch is configured to maximize a performance parameter for the beam direction.

12. The method of claim 11, wherein the performance parameter is one of gain, signal to noise ratio, SNR, and directivity.

13. The method of claim 10, wherein configuring the at least one switch includes applying a machine learning algorithm to learn a configuration of the at least one switch that achieves a performance objective.

14. The method of claim 10, wherein configuring the at least one switch includes performing a numerical electromagnetic analysis of a model of the antenna array.

15. The method of claim 14, wherein the numerical electromagnetic analysis is performed to determine a direction of surface waves on the antenna array.

16. The method of claim 10, wherein configuring the at least one switch is based at least in part on a distance between an antenna element in electrical communication with a deactivated RF branch and an antenna element in electrical communication with an activated RF branch.

17. The method of claim 10, wherein configuring the at least one switch is based at least in part on a direction from an antenna element in electrical communication with a deactivated RF branch to an antenna element in electrical communication with an activated RF branch.

18. The method of claim 10, wherein one of activating and deactivating each RF branch includes deactivating at least one RF branch having antenna elements that are adjacent to antenna elements of at least one activated RF branch.

* * * * *